(12) United States Patent
Wurm

(10) Patent No.: US 8,559,642 B2
(45) Date of Patent: Oct. 15, 2013

(54) CRYPTOGRAPHIC COMMUNICATION WITH MOBILE DEVICES

(75) Inventor: Michael Wurm, Redwood City, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

(21) Appl. No.: 13/339,093

(22) Filed: Dec. 28, 2011

(65) Prior Publication Data

US 2012/0170751 A1   Jul. 5, 2012

Related U.S. Application Data

(60) Provisional application No. 61/428,146, filed on Dec. 29, 2010.

(51) Int. Cl.
*H04L 29/06* (2006.01)

(52) U.S. Cl.
USPC .......................................... 380/283; 380/278

(58) Field of Classification Search
USPC .................................................. 380/283, 278
See application file for complete search history.

(56) References Cited

U.S. PATENT DOCUMENTS

| 4,811,393 | A | 3/1989 | Hazard |
| 5,081,678 | A | 1/1992 | Kaufman et al. |
| 2002/0090091 | A1* | 7/2002 | Ng et al. ................... 380/286 |
| 2005/0033957 | A1 | 2/2005 | Enokida |
| 2005/0050322 | A1 | 3/2005 | Mizrah |
| 2006/0164208 | A1 | 7/2006 | Schaffzin et al. |
| 2007/0264965 | A1* | 11/2007 | Taniguchi .................. 455/403 |
| 2009/0198618 | A1 | 8/2009 | Chan et al. |

FOREIGN PATENT DOCUMENTS

EP   0786881 A2   7/1997

OTHER PUBLICATIONS

Asokan, N., & Ginzboorg, P. (2000). "Key agreement in ad hoc networks." Computer Communications, 23(17), 1627-1637.*
De Clercq, Jan, "Smart Cards", *Microsoft*/TechNet, 2011, 22 pages. http://technet.microsoft.com/en-us/library/dd277362.
"How the Kerberos Version 5 Authentication Protocol Works," *Microsoft* /TechNet, Oct. 7, 2009, pp. 1-72. http://technet.microsoft.com/en-us/library/cc772815.
Lu, Li, et al., "Dynamic Key-Updating: Privacy-Preserving Authentication for RFID Systems," 5th Annual IEEE International Conference on Pervasive Computing and Communications (PerCom'07), New York, Mar. 2007, 10 pages.

(Continued)

*Primary Examiner* — Kambiz Zand
*Assistant Examiner* — Michael Guirguis
(74) *Attorney, Agent, or Firm* — Haynes and Boone LLP

(57) ABSTRACT

A mobile device (110), e.g. a token, holds a current key and one or more previous (expired) keys in memory (130). If the token needs to communicate with another device (144), e.g. with a reader, and the reader does not have the current key but has a previous key, the token encrypts the current key with the previous key and sends the ciphertext to the reader, which decrypts the current key. The token use different cryptographic material for communication with respective different facilities. Rather than requesting the reader to identify the facility, the token assumes that the facility is the same as in the most recent successful authentication. If the authentication fails, only then the token requests the reader to identify the facility. Authentication time and electric power are saved if the facility is the same. Other embodiments are also provided.

37 Claims, 8 Drawing Sheets

(56) References Cited

OTHER PUBLICATIONS

Courtois, Nicolas T., "The Dark Side of Security by Obscurity and *Cloning MiFare Classic Rail and Building Passes, Anywhere, Anytime*," University College London, Computer Science, London, UK, 2009, 8 pages.

Neuman, Clifford, et al., "Kerberos: An Authentication Service for Computer Networks," USC/ISI Technical Report No. ISI/RS-94-399, IEEE Communications Magazine, vol. 32, No. 9, Sep. 1994, 11 pages. http://gost.isi.edu/publications/kerberos-neuman-tso.html.

Lu, Li, et al., Slides for "Dynamic Key-Updating: Privacy-Privacy Preserving Authentication for RFID Systems," State Key Laboratory of Information Security, Graduate School of Chinese Academy of Sciences, 2007, 34 pages.

From Wikipedia, "Two-Factor Authentication," retrieved Dec. 22, 2011, 16 pages.

Hoepman, Jaap-Henk, "Symmetric Key Authentication Using Verification in Public," Department of Computer Science, University of Twente, the Netherlands, Aug. 29, 2000, 19 pages. (2001), CiteSeer web site at http://citeseerx.ist.psu.edu/viewdoc/summary?doi=10.1.1.20.2386 (a preliminary version of this paper appeared at the *Financial Cryptography* 2000 conference).

Bryant, Bill, "Designing an Authentication System: a Dialogue in Four Scenes," Massachusetts Institute of Technology, 1997, 17 pages.

PCT International Search Report mailed Aug. 31, 2012 for International Patent Application No. PCT/US2011/067675 filed Dec. 28, 2011, 3 pages total.

* cited by examiner

CRYPTOGRAPHIC COMMUNICATION WITH MOBILE DEVICES

CROSS REFERENCE TO RELATED APPLICATIONS

The present application claims priority of U.S. provisional patent application no. 61/428,146, filed on 29 Dec. 2010 by Michael Wurm, incorporated herein by reference.

BACKGROUND OF THE INVENTION

The present invention relates to cryptographic communication with mobile devices. Some aspects of the invention were motivated by authentication problems related to smartcards and other hardware security tokens (also called identity tokens or hardware tokens or just tokens herein). The invention is not limited to such problems however.

Identity tokens such as smartcards, RFID tags, and battery powered key fobs are widely used to provide authenticated access to services, e.g. to provide physical access to buildings, rooms and other areas, or electronic access to computer networks, databases and other computer resources. As shown in FIG. 1, an identity token 110 includes a computer processor (typically a microprocessor) 120 with a computer memory 130 storing authentication data such as the token identification (ID) 134, a cryptographic key 138, and maybe personal information (e.g. name) of the token's holder 140, and maybe other information. Memory 130 also stores a computer program 142 executed by processor 120 to authenticate the token holder to a token reader 144. In addition, the token includes an interface 150 used to communicate with reader 144. Interface 150 can be wireless (e.g. RF (radio frequency) for Radio Frequency Identification (RFID)). Reader 144 includes a suitable interface 170 for communicating with the token. Reader 144 further includes a computer processor 174 and memory 180 which stores cryptographic keys 184 for different tokens (keys 184 may or may not be equal to the tokens' keys 138) and stores a computer program 186 executed by processor 174 to authenticate the token. Upon successful authentication, reader 144 allows the token holder 140 to access the pertinent resource, e.g. reader 144 causes unlocking of an electronic door guarding access to a secured building or allows electronic access to a computer resource such as a network or a database.

At least some of cryptographic keys 138, 184 must be kept secret in order to prevent false authentication by an unauthorized person. These keys can be stolen or guessed, and in order to limit the resulting damage the keys are periodically changed ("updated"). A token's key 138 and the readers' keys 184 must be updated at the same time to ensure that the token holder will have uninterrupted access to the secured resource. Some embodiments of the present invention provide techniques that help ensure uninterrupted access when token keys 138 and reader keys 184 are not updated at the same time.

A single token can be used for multiple purposes, e.g. to provide access to different areas requiring different cryptographic keys. Some embodiments seek to simplify authentication for multi-purpose tokens.

SUMMARY

This section summarizes some features of the invention. Other features may be described in the subsequent sections. The invention is defined by the appended claims, which are incorporated into this section by reference.

Key Update.

As noted above, uninterrupted access to a secured resource can be compromised if token keys 138 are not updated at the same time as reader keys 184. The problems addressed by some embodiments, and the solutions provided by some embodiments of the present invention, will now be described on the example of FIG. 2. The invention is not limited to the example of FIG. 2 however.

In this non-limiting example, tokens 110 are used to access rooms, buildings or other resources located in an area such as a university campus, or an office complex, or a factory, etc. A server 210 (a computer system consisting of a single computer or a number of networked computers) generates keys 138, 184 and distributes the keys to tokens 110 and readers 144 through network 230, router (gateway) 220, and network 234 to which the readers 144 and tokens 110 are connected. Network 230 may include wireless and/or wired links, and may be the Internet. Network 234 includes wireless interface for tokens 110 and wired or wireless interface for readers 144. Router 220 translates traffic between the network 230 and network 234. In this example, the readers 144 are stationary and are typically available for communication at any time or at least often. However, the holders of tokens 110 can take their tokens out of the range of network 234 for extended periods of time, for example if a holder leaves for vacation. Therefore, tokens 110 are not as easily available for key updates.

Hence, in some embodiments, when a token's key 138 and the corresponding keys 184 should be updated, the update of keys 184 is delayed, or at least the updated keys 184 are not activated, until the token update completes. In some embodiments, the update of keys 184 on readers 144 is performed only after the server 210 receives a confirmation from the token that the token key has been updated.

A key update may incur significant latency depending on the load on, and capabilities of, server 210 and other pertinent resources (e.g. networks 230 and 234 and router 220). For example, if server 210 services a large number of readers 144, and the keys 184 associated with a token must be updated on all the readers, the key update on some reader 144 may be delayed by a long time. During this delay, the reader 144 may store the old key for the token, and moreover different readers 144 may store different old keys if some readers are behind by two or more updates. Therefore, in some embodiments, token 110 stores one or more old keys to ensure successful authentication to such readers.

Further, in some embodiments, if a token 110 engages in cryptographic communication with a reader 144 which does not have the current key (the updated key), the reader's key can be updated in a secure manner from the token rather than server 210. In some embodiments, the update occurs without communication with server 210.

In some embodiments, the readers' keys are updated only from the tokens. The key update is secure because it uses an old key for authentication and/or encryption.

Multi-Purpose Tokens.

The inventor has observed that a multi-purpose token may use a key for a single purpose multiple times before switching to a different key for a different purpose. For example, suppose a token is used to access buildings at university campuses A and B, and uses different cryptographic keys 138 for these campuses—a key $K_A$ for campus A and a key $K_B$ for campus B. Successful authentication requires the correct key, so an authentication protocol may involve a preliminary message exchange between the token and a reader 144 to allow the token determine if the reader is located on campus A or B. In some embodiments, this preliminary exchange can be omitted. The token remembers which key, $K_A$ or $K_B$, was used in the last successful authentication, and the token continues to use the same key until authentication failure. In case of failure, the token attempts authentication with the other key.

The invention is not limited to identity tokens for building access. A device 110 can be a mobile computer authenticated by a server 144 providing access to a network, a database, or some other resource. Also, the invention is not limited to authentication. For example, the invention can be used for a mobile computer 110 to establish a shared encryption key with another computer 144. Authentication may or may not take place. Other embodiments and variations are within the scope of the invention as defined by the appended claims.

DESCRIPTION OF SOME EMBODIMENTS

Figure 1:
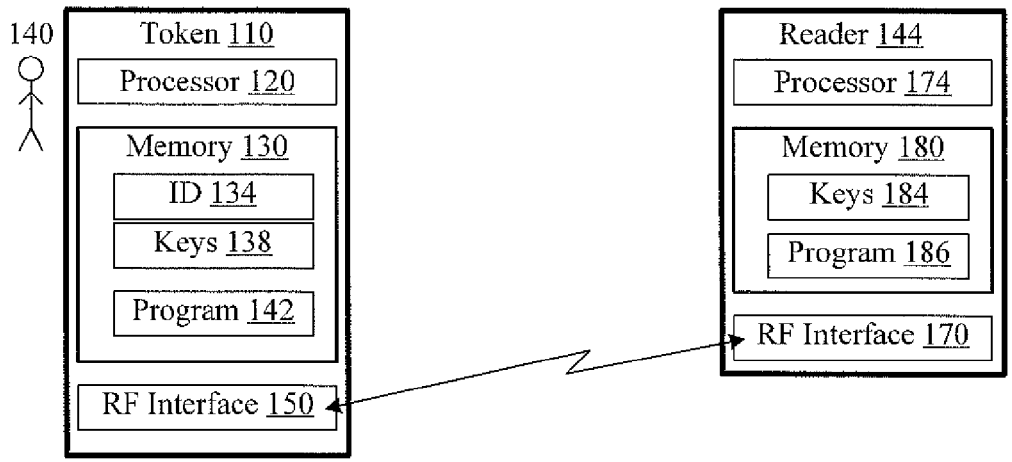
FIG. 1 is a block diagram of a token and a reader according to prior art.

The embodiments described in this section illustrate but do not limit the invention. The invention is defined by the appended claims.

For ease of illustration, some embodiments will now be described on the example of tokens 110 using RF interface to communicate with readers 144 such as used for secured building access, but the invention is applicable to other types of secure access (e.g. computer routers or servers 144 providing access to a network or some other computer resource), and to non-RF interfaces (e.g. to infrared or other frequency wireless interfaces, or to wired interfaces such as USB (Universal Serial Bus)). The term "token" means "hardware token" in this disclosure unless specifically stated otherwise.

Key Update

Some embodiments of the invention were motivated by the following concerns (the invention is not limited to embodiments that meet such concerns however). As alluded to hereinabove, cryptographic keys 138 and 184 should be periodically updated in order to limit the amount of ciphertext that can be decrypted when an adversary recovers a key 138 or 184, and in order to limit the amount of ciphertext and other information that can be used to recover the key, including information that can be obtained, for a given key, by measuring power consumption, electromagnetic radiation, or execution times of the cryptographic algorithms.

Figure 2:
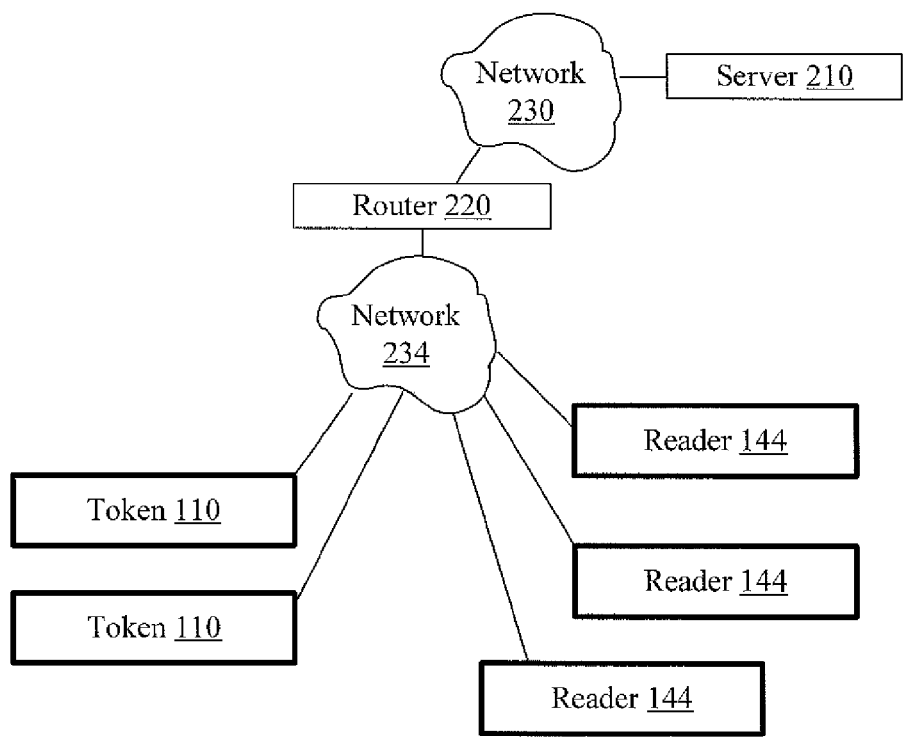
FIG. 2 is a block diagram of a networked security system with multiple readers and tokens according to some embodiments of the present invention.

In a traditional approach, a new key is generated by a key manager at a central station (such as server 210 in FIG. 2) and is transmitted to tokens 110 and readers 144. Alternatively, a reader 144 can receive an updated key by means of asymmetric cryptography directly from a token 110. However both ways have problems:

The first option—update of tokens 110 and readers 144 from a key manager at server 210—can incur a serious communication overhead and delay. Further, as described above, there is a potential problem when not all devices (tokens 110 and readers 144) are updated simultaneously, and some devices still have the old key while others already have the new key.

The second option—readers 144 receive keys from tokens 110 via asymmetric cryptography—may lead to many public-key operations on a token 110 if the token's key must be provided to many readers. Public-key operations are computationally expensive, and therefore cause delays and increased power consumption.

However, in many embodiments involving multiple readers 144, a token 110 communicates frequently with one set of readers 144 or other devices that are in the daily work area of the token's holder, and token 110 communicates only sparingly with devices that are in less frequently visited parts of a building. It is therefore desirable to provide fast and energy efficient key updates for the former set of devices. At the same time, key updates should remain possible with the latter set of devices, however with relaxed energy and time constraints.

It is noted however that the present invention is not limited to embodiments free of the problems described above in connection with prior art. The invention is sufficiently broad to cover problem embodiments.

In some embodiments of the present invention, a reader can receive a key update directly from a token 110 using symmetric cryptography at least in some situations. More particularly, the token may store a current (updated) key and one or more older key versions. If the reader has an older key a copy of which is still stored on the token, then the token may use the older key for symmetric encryption of the current key, e.g. the older key may be used as an encryption key. The reader decrypts the current key using the reader's copy of the older key.

Figure 3:
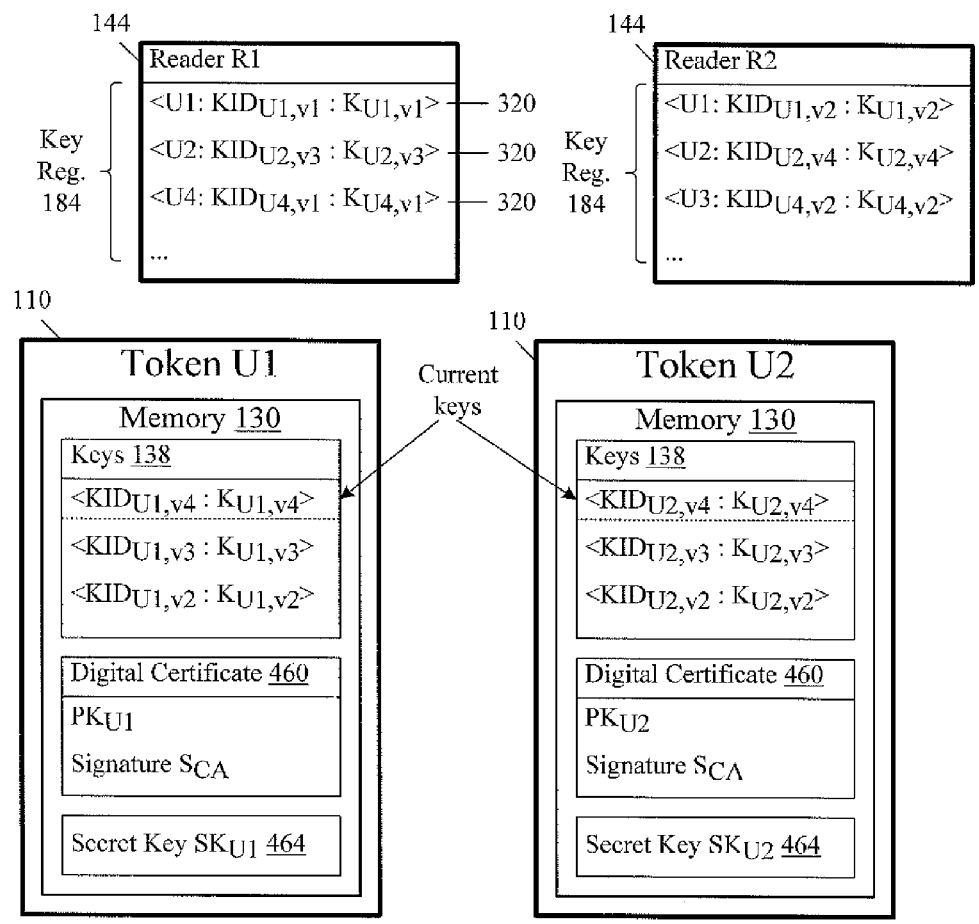
FIG. 3 illustrates cryptographic material in readers and tokens according to some embodiments of the present invention.

For the sake of simplicity, we will first consider a system in which the token's key 138 is identical to the corresponding key 184 (this shared key can be used as a shared secret key for token authentication). FIG. 3 shows a number of tokens 110 having respective token identifiers U1, U2, ..., and a number of readers 144 having respective reader identifiers R1, R2, .... Each token Ui (i=1, 2, ...) stores its current key and one or more older versions of the key. The key of version j for a token Ui is denoted as $K_{Ui,vj}$. (The expression "key version" may denote a key such as $K_{Ui,vj}$ or the key's version identifier "j".) For example, token U1 stores, as shown at 138, the current key $K_{U1,v4}$ (version 4) and stores two immediately preceding versions $K_{U1,v3}$ and $K_{U1,v2}$. (We assume that the consecutive versions are numbered as 1, 2, 3, ..., but the invention is not limited to any particular designation or numbering of versions; for example, a version could be specified by specifying the key's expiration time.)

In the example of FIG. 3, the first version $K_{U1,v1}$ has been discarded by token U1 because the token stores only two previous versions. (The invention is not limited to any particular number of key versions stored on a token.)

In addition, for each key $K_{Ui,vj}$, the token stores the key's identifier $KID_{Ui,vj}$. The key identifier $KID_{Ui,vj}$ may include the key version identifier "j" (e.g. "2" for $K_{U1,v2}$), and/or the key's expiration date, and/or other information. The key version identifier does not have to be secret.

In FIG. 3, colon (":") denotes concatenation.

Each reader 144 has a key registry 184 (sometimes called Access Control List, or ACL) which holds keys for tokens 110 serviced by the reader. In the example of FIG. 3, reader R1 stores keys for tokens U1, U2, U4; reader R2 stores keys for tokens U1, U2, U3. In some embodiments, the reader stores at most one key for each token that the reader is to service. The reader may store no key, and in this case the reader can obtain the key from server 210 or the token as explained below.

More particularly, each reader's key registry 184 contains a number of entries 320. Each entry 320 corresponds to a single token Ui serviced by the reader. For this token, the entry 320 has the form:

<Ui:$KID_{Ui,vj}$:$K_{Ui,vj}$:etc.> where Ui is the token's identifier, $K_{Ui,vj}$ is a key for the token (this may be the current key or an old key), and $KID_{Ui,vj}$ is the key identifier. The term "etc." indicates that the entry may contain other information, e.g. the time when access can be granted to the token. The "etc." term is optional and not shown in the drawings.

Of note, a reader 144 may store different key versions for respective different tokens, and may lack a key for some of the tokens as explained above.

In some embodiments, a reader 144 controls access to a resource, and the key registry 184 is the access control list containing entries 320 only for the tokens that are to be granted access to the resource, or only for the tokens with which the reader communicated most recently. In some embodiments, a device 144 is a router, and the key registry 184 is a key cache that contains entries 320 for the tokens that are to be given network access through the router, or key registry 184 may contain entries 320 for the tokens with which the router communicated most recently. These are non-limiting examples.

In some embodiments, the key updates are controlled by a key manager which may, for example, be part of server 210 (acting as the central control station). Each of server 210 and router 220 may be a computer system with one or more computer processors and computer memory holding the computer programs and data to implement functionality described herein. All or part of each of server 210 and/or router 220 may also be implemented by hardwired (non-programmable) devices.

Figure 4:
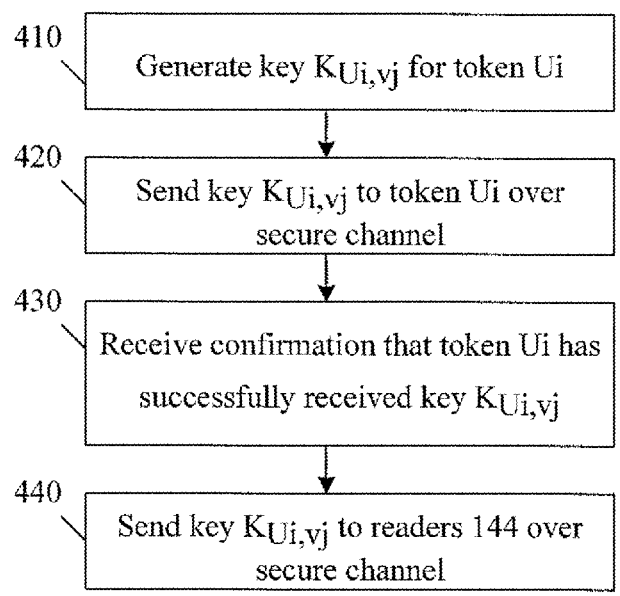
FIG. 4 is a flowchart of key generation and distribution according to some embodiments of the present invention.

FIG. 4 illustrates a process used by the key manager (which can be a computer program executed by server 210) to provide keys for the tokens 110 serviced by the key manager. The keys can be generated according to a predefined schedule, and/or at a request from a token holder or security personnel, and/or in response to some event. When the token is first put into use, the token is initialized with a key generated by the key manager or by some other entity.

When a key manager generates a new key for a token (step 410 in FIG. 4), the key manager conveys the key to the token over a secure channel possibly passing through network 230, router 220, and network 234 and/or through other media (e.g. a USB port). See step 420. In some embodiments, the key manager does not provide the new key to any of the readers until the key is received by the token. For example, in some embodiments, the key manager waits for the token confirmation (step 430) of the key receipt before the key manager sends the key over a secure channel to the readers (step 440). The token confirmation may or may not be provided over a secure channel. (In other embodiments, the key manager may provide the new key to the readers before step 430 but may disallow the readers to use the new key until after step 430.)

To establish a secure connection (secure channel) at step 420, the token may have to authenticate itself to the key manager. In some embodiments, the key manager also authenticates itself to the token. The token authentication to the key manager may involve known techniques, involving symmetric or asymmetric cryptography. For example, in some asymmetric embodiments, when the token Ui is initialized, a public key $PK_{Ui}$ and a matching secret key $SK_{Ui}$ are generated for the token, and a digital certificate 460 (FIG. 3) is created including the token identification Ui, the public key $PK_{Ui}$, and possibly other data (e.g. the certificate's expiration date). The certificate is signed by a Certification Authority (not shown, possibly the key manager or some other program executed by server 210). The certificate 460 and the secret key $SK_{Ui}$ (shown at 464) are stored in the token's memory 130.

To set up the secure connection, the token sends the certificate 460 to the key manager, or the key manager obtains the certificate 460 from elsewhere (possibly from a local cache, not shown). Known authentication techniques can be used. The key manager may, for example, generate a random number r, encrypt it with the token's public key $PK_{Ui}$, and send the ciphertext to the token. The token decrypts the ciphertext with the secret key $SK_{Ui}$ to obtain the number r, and sends r or a hash of r to the key manager as proof that the token knows the secret key $SK_{Ui}$. Other authentication techniques are also possible, which also may result in generation of a shared secret session key by the token and the key manager. The shared key can be used for subsequent symmetrically encrypted communication to transmit the new key $K_{Ui,vj}$ to the token.

A similar process can be used by the token to authenticate the key manager, using the key manager's digital certificate (not shown).

In some embodiments, at step 440, the key manager distributes the key to readers 144 over secure connections established with each reader. In other embodiments, step 440 is omitted—the key manager does not send the key $K_{Ui,vj}$ to the readers; the readers receive the keys directly from the tokens as described below. The key manager only provides to each reader 144 the list of tokens that are to be serviced by the reader. A combination of these solutions is also possible—a reader may receive the key $K_{Ui,vj}$ from either the token or the key manager as described below.

At step 420, the key manager may transmit to token 110 both the key $K_{Ui,vj}$ and the key identifier $KID_{Ui,vj}$.

When the token 110 receives the new key $K_{Ui,vj}$, the token stores the key in memory 130 as the current key. The token also keeps one or more previous keys. In some embodiments, the oldest key may be shifted out (discarded) if all the keys would not fit into the memory allocated for the keys.

In some embodiments, when the token discards the oldest key, care is taken to ensure that each reader 144 servicing the token has one of the keys remaining on the token. (This key is shared by the reader and the token, and can be used for token authentication to the reader.) For example, in some embodiments, the key manager will not generate a new key for the token if there is at least one reader which services the token and which has the key which would be discarded upon the token receiving the new key.

In other embodiments, the oldest key can be discarded even if some of the readers do not have a newer key kept by the token. In this case, a reader can get the current key from the token without using a previous key for the token authentication. Alternatively, a reader can get the current key from the key manager or maybe from another reader.

In some embodiments, a key update for a token is initiated by the token itself, without the key manager. The token generates a new cryptographic key $K_{Ui,vj}$ and selects a new identifier $KID_{Ui,vj}$ for the key. The token inserts the newly generated key $K_{Ui,vj}$ as the current key into memory 130 as discussed above, and saves one or more most recent old keys possibly discarding the oldest key.

Figure 5:
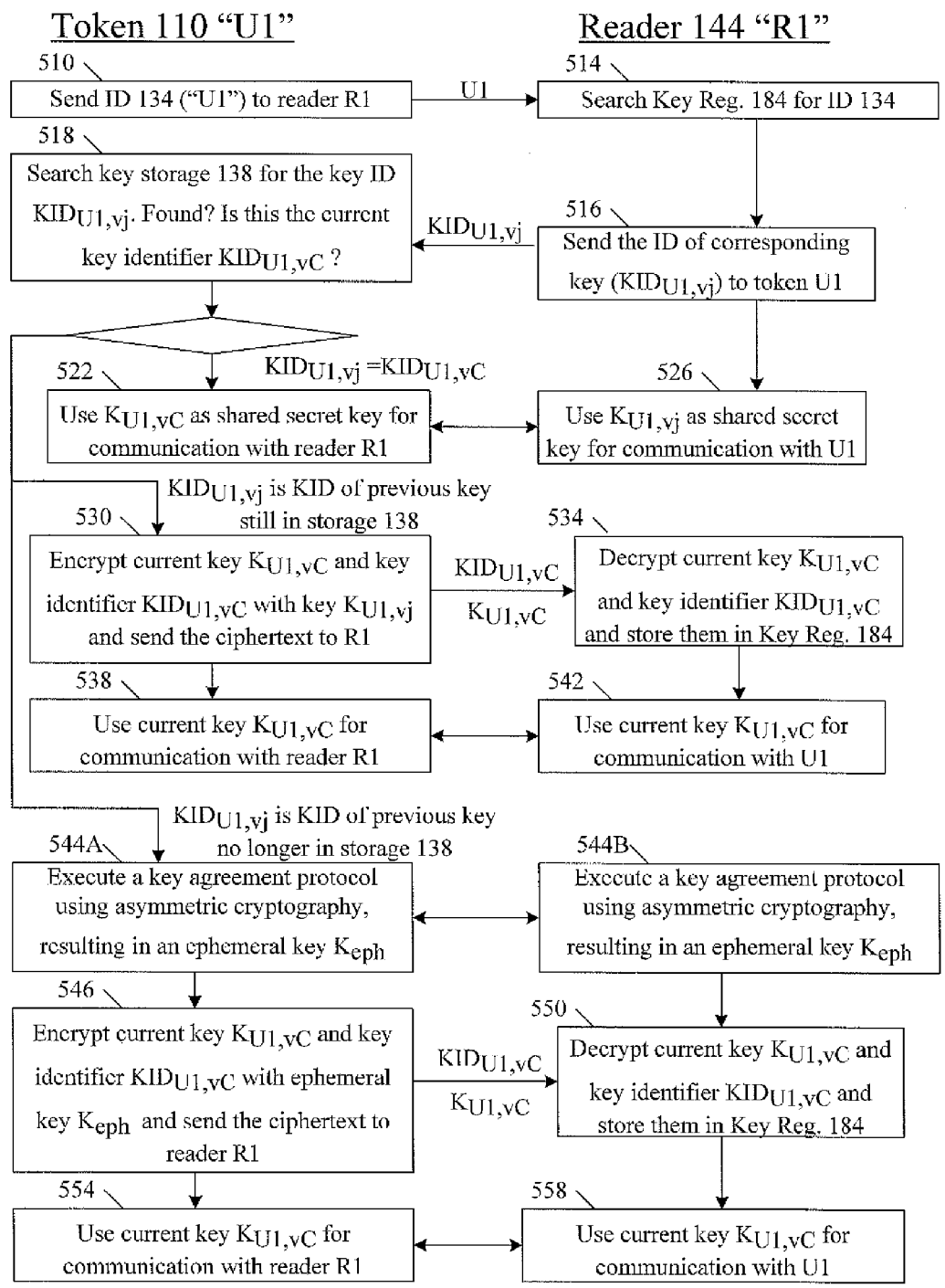
FIG. 5 is a flowchart of a process for cryptographic communication (e.g. authentication) between a token and a reader according to some embodiments of the present invention.

FIG. 5 illustrates establishment of secure communication between a token 110 and a reader 144 in some embodiments of the present invention. For illustration, the token ID is U1 and the reader ID is R1, but the same protocol can be used for any token/reader IDs. At step 510, the token sends its ID 134 (i.e. "U1") to the reader. At step 514, the reader searches its entries 320 (FIG. 3) in key registry 184 for the ID "U1". If the ID is found, the reader may check pertinent permissions in U1's entry 320, e.g. whether the token "U1" can be granted access at the current time. If the ID is not found, or the permissions do not allow access, the reader may abort the communication. Otherwise, the reader retrieves the corresponding cryptographic key $K_{U1,vj}$ and the key's identifier $KID_{U1,vj}$ from the key registry (step 516). The reader sends the key identifier $KID_{U1,vj}$ to token U1 (the key itself is not transmitted between the reader and the token for enhanced security). At step 518, token U1 determines whether or not the key identifier $KID_{U1,vj}$ is in the token's key storage 138 and whether or not the key identifier is associated with the current key, denoted below as $K_{U1,vC}$.

If the key identifier $KID_{u1,vj}$ is the same as $KID_{u1,vC}$, then the token assumes that the reader has the current key for the token, and in subsequent communication the reader and the token use this key as a shared secret key as shown at 522 and 526. The subsequent communication may involve authentication of the token to the reader and/or of the reader to the token. Authentication may involve any known techniques, for example a challenge-response protocol intended to ascertain that the token's key $K_{U1,vC}$ is the same as the reader's key $K_{U1,vj}$. For example, to authenticate the token, the reader may generate a random value r and send it to the token. The token encrypts r under the key $K_{U1,vC}$ in symmetric encryption, and sends the encrypted value to the reader. The reader encrypts r under key $K_{U1,vj}$ and compares the result with the encrypted value received from the token. Authentication succeeds if the two values coincide. Otherwise authentication fails. Other authentication techniques can also be used. If desired, the token and the reader may use this shared secret key to generate another shared secret key, e.g. a session key which incorporates the current time information in order for each authentication session to be performed with a different key for greater security. Non-authentication communications are also possible, and the shared key can be used for symmetric encryption of such communication. For example, if device R1 is a router providing a network access and token U1 is a computer desiring to access the network, then the subsequent communication may involve network communications, and the shared key can be used for symmetric encryption of such communications on the link between the computer and the router. In some embodiments, no authentication is performed. The invention is not limited to any particular devices or communications.

If at step 518 the token determines that $KID_{U1,vj}$ is the identifier of an older key still in the token's storage 138, then the token assumes that the reader possesses the older key $K_{U1,vj}$. At step 530, the token symmetrically encrypts the current key $K_{U1,vC}$ and its identifier $KID_{U1,vC}$ with the older key $K_{U1,vj}$ and sends the ciphertext to the reader. At step 534, the reader recovers the current key and its identifier from the ciphertext using the reader's key $K_{U1,vj}$. The reader then stores the current key $K_{U1,vC}$ and its identifier $KID_{U1,vC}$ in the reader's key registry 184 for the token U1, replacing $K_{U1,vj}$ and its identifier $KID_{U1,vj}$ in the key registry. Then token U1 and reader R1 use the current key $K_{U1,vC}$ for subsequent communication (e.g. authentication and/or other cryptographic communications) as shown at 538 and 542 respectively. The subsequent communication can be as described above for steps 522 and 526.

Alternatively, authentication or other cryptographic communication can be performed using the older key $K_{U1,vj}$ as a shared secret key, or using a key derived from the older key, before the token sends the current key $K_{U1,vj}$ to the reader.

If at step 518 the token does not find $KID_{U1,vj}$ in its storage 138, then the token may assume that the reader has an older key no longer stored on the token. In this case (steps 544A, 544B), the token engages the reader in a key agreement protocol using asymmetric cryptography, e.g. using the token's digital certificate 460 (FIG. 3) and a similar digital certificate stored on the reader (not shown). The key agreement protocol authenticates the token to the reader, and possibly authenticates the reader to the token, in a process similar to the one discussed above with respect to establishing a secure channel between a token and the key manager at step 420. The key agreement protocol may also result in both the token and the reader generating an ephemeral (temporary) secret key $K_{eph}$ which can be used for symmetric encryption. At step 546, the token symmetrically encrypts the current key $K_{U1,vC}$ and its identifier $KID_{U1,vC}$ with the ephemeral key $K_{eph}$ and sends the ciphertext to the reader. At step 550, the reader decrypts the current key and its identifier using the ephemeral key $K_{eph}$. The reader then stores the current key $K_{U1,vC}$ and its identifier $KID_{U1,vC}$ in the reader's key registry 184 for the token U1, replacing $K_{U1,vj}$ and its identifier $KID_{U1,vj}$ in the key registry. Then token U1 and reader R1 use the current key $K_{U1,vC}$ for authentication and other subsequent communications as shown at 554 and 558 and described above. Authentication may be omitted in view of previous authentication at steps 544A, 544B as described above.

In some embodiments, at step 546, the token encrypts the current key and its identifier with the token's asymmetric secret key $SK_{U1}$, and at step 550 the reader decrypts the current key and its identifier using the token's public key $PK_{U1}$. Other embodiments are possible.

Generation of ephemeral key $K_{eph}$ at steps 544A, 544B is omitted in some embodiments. Instead, reader 144 obtains the current key $K_{U1,vC}$ from the key manager. Similarly, at step 534, the reader can obtain the current key from the key manager instead of the token.

At step 514, if the reader does not find a key for the ID "U1", the reader obtains the current key from the key manager. Alternatively, the reader obtains the key from the token using any process described above, for example through execution of steps 544A, 544B, 546, 550. Other variations are possible. For example, if the device 144 is a router providing network access to mobile computers 110, and the router's key registry 184 is a cache of entries 320 for the mobile computers which were most recently provided network access, and the ID "U1" is not found at step 514, then the router may obtain the key from computer 110 using, for example, steps 544A, 544B, 546, 550.

In some embodiments, if the reader obtained the current key from the token at step 534 or 550, but subsequent authentication (or other cryptographic communication) failed, then the reader obtains the current key from the key manager and the authentication (or the other cryptographic communication) is performed again. This may happen for example due to namespace limitation for the key identifiers $KID_{Ui,vj}$. For example, when two bits are used to encode a key identifier, then the key identifier is repeated for every fourth key, i.e. $KID_{Ui,vj}=KID_{Ui,vj+4}$. The reader and the token may therefore use the same key identifier for different keys. When this happens, authentication can fail at steps 522 and 526, or at steps 538 and 542. If the authentication fails, the reader obtains the current key from the key manager and the authentication is performed again. Alternatively, before obtaining the current key from the key manager, authentication may be attempted by the token using an older key with the same identifier if such a key is stored on the token. The same process can be used as described above for steps 530-542.

As is clear from this description, in some embodiments, asymmetric cryptography is used only if the reader does not have any of the current and previous keys stored on the token.

Figure 6:
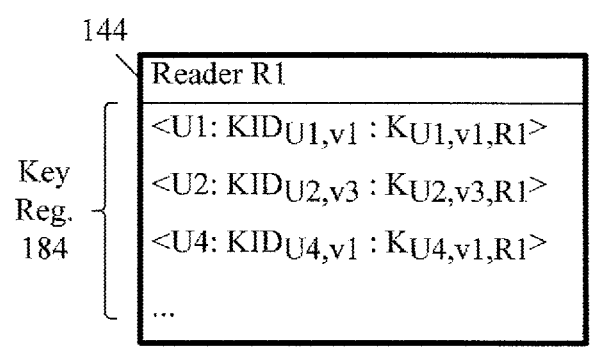
FIG. 6 illustrates cryptographic material in a reader using diversified keys according to some embodiments of the present invention.

The key update techniques described above are compatible with many existing schemes for key generation, and in particular with diversified keys. Key diversification is described, for example, in Jaap-Henk Hoepman's paper entitled "Symmetric key authentication using verification in public" (2001), available from CiteSeer web site at http://citeseerx.ist.psu.edu/viewdoc/summary?doi=10.1.1.20.2386, incorporated herein by reference. (A preliminary version of this paper appeared at the *Financial Cryptography* 2000 conference.) Without key diversification, if a reader 144 is compromised, i.e. the reader's key registry 184 is stolen, then the stolen keys can be used to forge the corresponding tokens 110 on any other reader. With key diversification, keys stolen from one reader are unusable on other readers. For example, in some embodiments, instead of a key $K_{Ui,vj}$ the reader Rk stores the key's diversified version:

$$K_{Ui,vj,Rk} = \text{diversify}(K_{Ui,vj}, Rk)$$

where "diversify" is a suitable function that makes it difficult (possibly computationally infeasible) to recover the key $K_{Ui,vj}$ from the diversified key $K_{Ui,vj,Rk}$. This is illustrated for reader R1 in FIG. 6. The diversify function can be, but is not limited to, a cryptographic hash function, or a cipher that encrypts the reader's identity Rk using the key $K_{Ui,vj}$ or some other key. For example, in Hoepman's article, each token's key is a ciphertext obtained by encrypting the token's ID under a master key known to the key manager; and the diversified key is a ciphertext obtained by encrypting the reader's ID under the token's key. As noted above, a hash function can be used instead of encryption. Such schemes are commonly used in building security systems.

In some embodiments of the present invention for example, each key $K_{Ui,vj}$ is a ciphertext obtained by encrypting a string including the token identity Ui and the version j under a master key stored by the key manager. The diversified key $K_{Ui,vj,Rk}$ is a ciphertext obtained by encrypting a string including the reader identity Rk under the key $K_{Ui,vj}$. The key $K_{Ui,vj}$ is unknown to the readers. If the reader Rk is compromised, the adversary gets possession of the keys $K_{Ui,vj,Rk}$ diversified for Rk but not for any other reader. The security damage is thus reduced.

The invention is not limited to a particular scheme for key generation or diversification.

Figure 7:
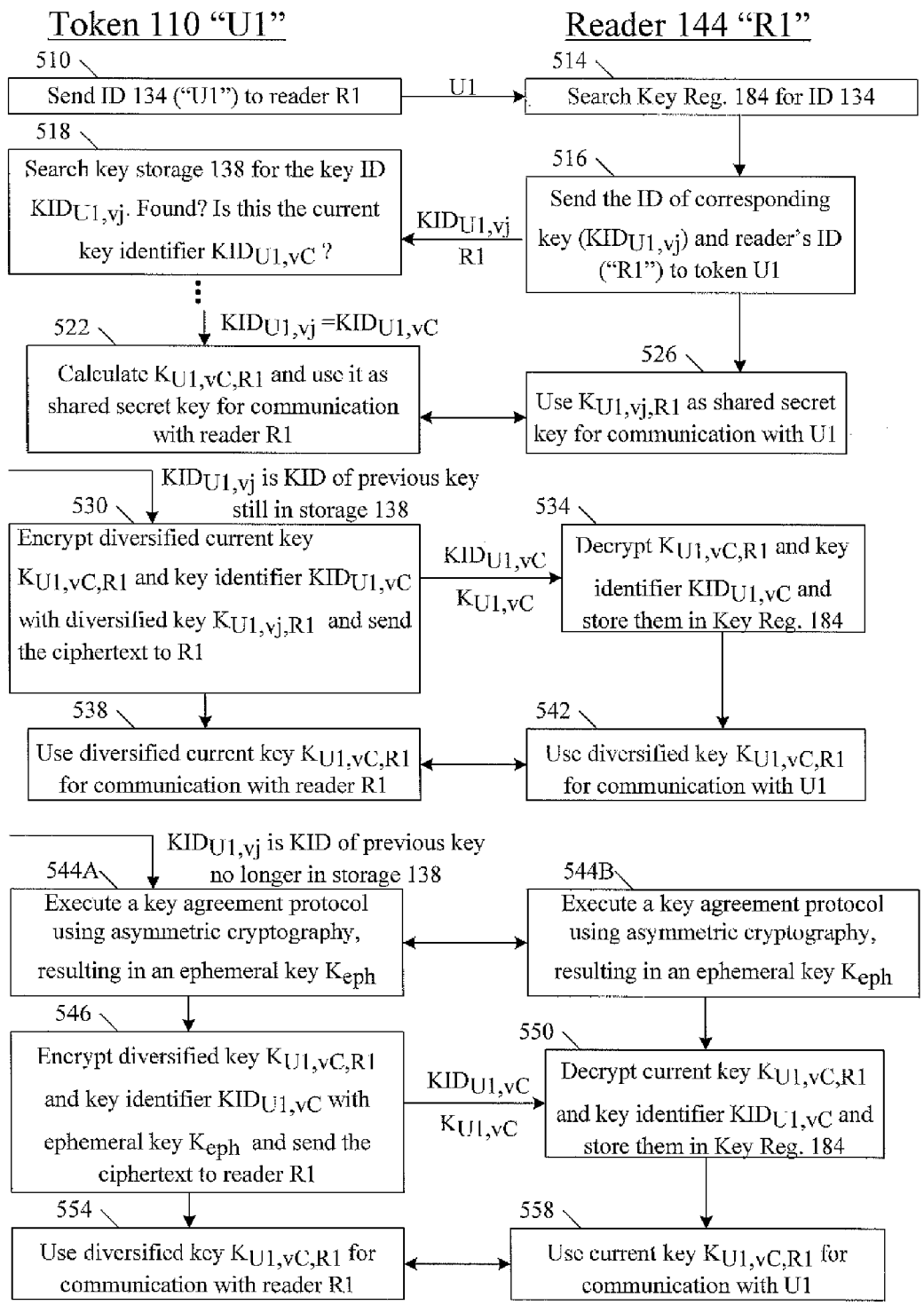
FIG. 7 is a flowchart of a process for cryptographic communication (e.g. authentication) between a token and a reader using diversified keys according to some embodiments of the present invention.

The method of FIG. 5 can be adjusted for the diversified keys, with the readers 144 storing only the diversified keys, as shown in FIG. 7. Each diversified key's ID can be identical to the ID of the corresponding non-diversified key (i.e. to $KID_{Ui,vj}$), or in some embodiments the ID of the non-diversified key $K_{Ui,vj}$ is computable from the diversified key's ID. The tokens store the non-diversified keys as in FIG. 3, but each token can diversify its keys for any reader using the diversify function. The process of FIG. 7 is identical to the process of FIG. 5 except as needed for diversification, so the description below omits features unrelated to diversification. At step 516, the reader 144 sends both the key identifier and the reader's identity ("R1") to the token.

At step 522 (i.e. if the reader's key identifier identifies the current key), the token calculates the diversify function on the current key for reader R1, and uses the diversified key $K_{U1,vC,R1}$ to communicate with the reader. The reader uses the key stored on the reader, which is a diversified key. Likewise, at step 530, the token diversifies, for reader R1, both the current key and the key corresponding to the key identifier received from the token, to obtain the diversified keys $K_{U1,vC,R1}$ and $K_{U1,vj,R1}$. The token encrypts the diversified current key $K_{U1,vC,R1}$ and the current key identifier with the diversified key $K_{U1,vj,R1}$ and sends the ciphertext to the reader. The reader decrypts the diversified current key and the key identifier using the diversified older key $K_{U1,vj,R1}$ stored on the reader.

Similarly, at step 546, the token diversifies the current key for reader R1, encrypts the diversified current key $K_{U1,vC,R1}$ and the current key identifier with the ephemeral key $K_{eph}$ and sends the ciphertext to the reader. The reader decrypts the diversified current key and the key identifier using the ephemeral key $K_{eph}$.

Multi-Purpose Tokens

Figure 8:
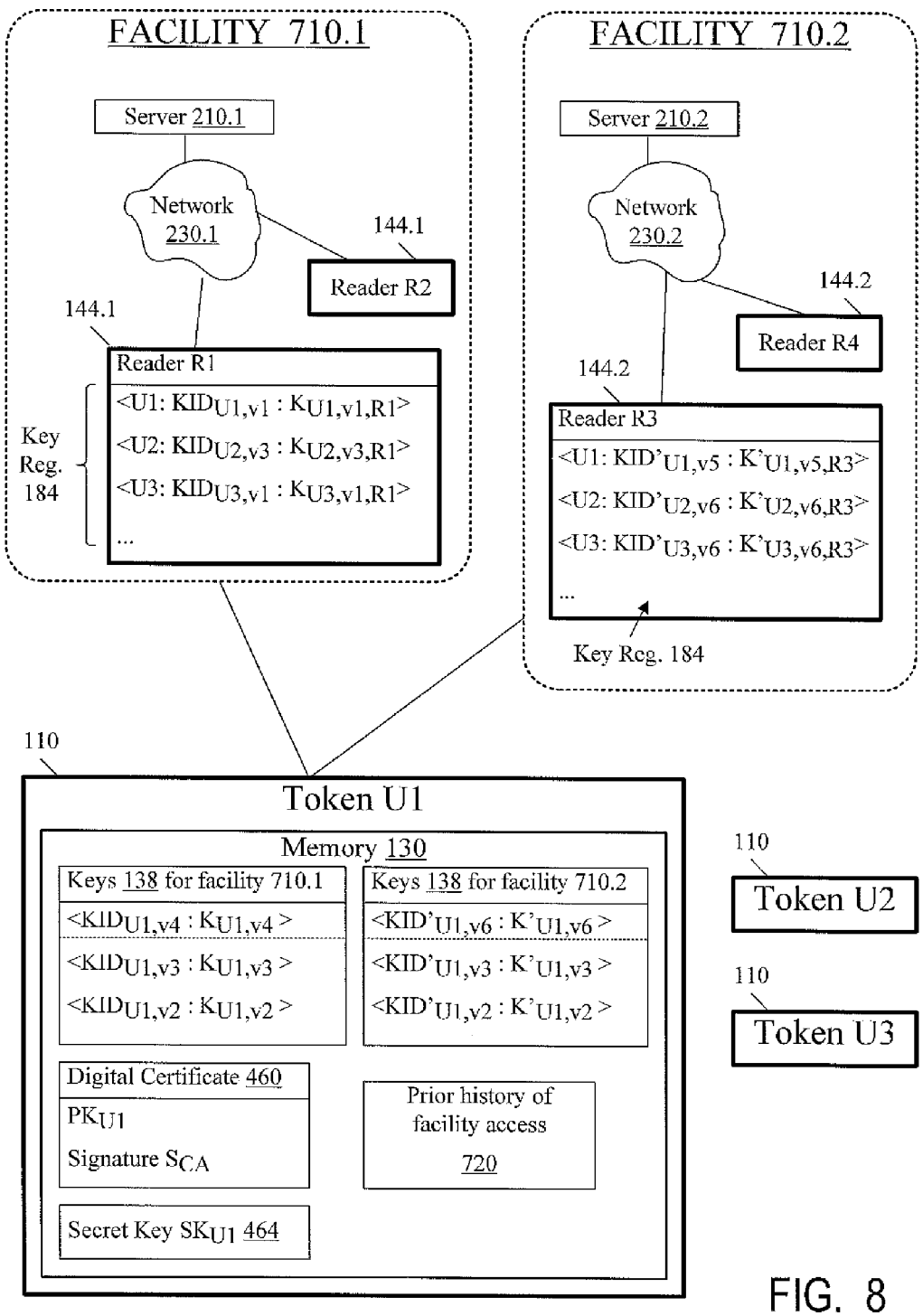
FIG. 8 illustrates cryptographic material in readers and multi-purpose tokens according to some embodiments of the present invention.

As stated above, a token 110 can be used for multiple purposes, and FIG. 8 shows a two-purpose example with: server 210.1, network 230.1, and readers 144.1 for one purpose; and server 210.2, network 230.2, and readers 144.2 for the other purpose. (Routers 220 (FIG. 2) and networks 234 may or may not be present, and if present they can be thought of as part of respective networks 230.1, 230.2; servers 210.1 and 210.2 can be implemented by the same computer or different computers, and networks 230.1 and 230.2 can also be the same network, and other variations are possible as discussed above.) In one example, the first purpose is providing access to buildings, rooms, and computer resources of a facility 710.1 (e.g. a university campus, a factory, a company, or any other type of facility). The second purpose is providing access to similar resources of a facility 710.2. The invention is not limited to particular facilities or number of facilities. For example, facility 710.1 could be a building, facility 710.2 could be a network router, and an additional facility (not shown) could be a bank account. Or each facility could combine a number of different services, and different facilities could be managed by the same or different companies, and could use different key managers on the servers 210.1 and 210.2. The set-up of FIG. 8 has the following properties:

Property 1:

Each facility generates and manages its own keys, and possibly uses its own cryptographic algorithms. Therefore, each token 110 which can access multiple facilities has a separate set of keys 138 for each facility—the key set 138.1 for facility 710.1 and the key set 138.2 for facility 710.2. The token's memory 130 may also store different authentication programs for different facilities. For example, one program may implement the method of FIG. 5 and another program may implement the method of FIG. 7 or some other method, or the method of FIG. 7 can be used with different authentication algorithms for different facilities. (This discussion relates to authentication for ease of illustration, but non-authentication cryptographic algorithms can be used instead of, or together with, authentication as discussed above.) Thus, different authentication programs may share some code and/or data. A facility may also use a prior art authentication program. In the example of FIG. 8, each facility uses diversified keys as shown in readers R1 and R3, and a token stores the current key and a number of older keys for each facility. The keys and key identifiers for facility 710.2 are shown with the apostrophe (K'$_U$ . . . , KID'$_U$ . . . ). There can be many differences between facilities, e.g. the token's ID 134 may be different for different facilities. This is not shown in FIG. 8 for simplicity.

Property 2:

The token holder is likely to access a reader of readers 144 of the same facility multiple times in a row before accessing a reader of another facility.

The invention is not limited to these two properties however.

Figure 9:
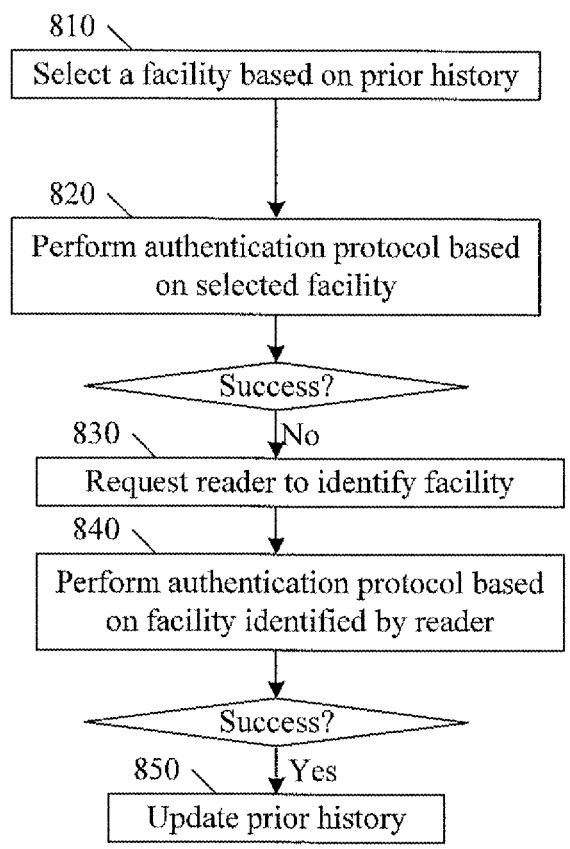
FIG. 9 is a flowchart of an authentication process for a multi-purpose token according to some embodiments of the present invention.

In order to authenticate itself to a reader, the token needs to determine the reader's facility. In order to reduce communication overhead and/or computational overhead associated with the token obtaining the facility identification from the reader, the token makes an assumption about the facility—see step 810 in the flow chart of FIG. 9. At this step, the token 110 makes an assumption as to the identity of the reader's facility, i.e. whether the facility is 710.1, 710.2, or some other facility. As shown in FIG. 8, each token's memory 130 stores prior history 720 of facility access. We will assume for the sake of simplicity that the prior history is simply a facility identifier of the most recent facility with which the token conducted successful authentication. When the token is first initialized, the facility identifier 720 is initialized to some default value (a default facility) using any technique, or is not initialized at all. In the latter case, the token may initialize the facility identifier 720 in any desired way, or may interrogate the reader as to what facility the reader belongs to (in which case the procedure of FIG. 9 is not followed for the first reader encountered after token initialization).

At step 820, the token and the reader engage in an authentication protocol for the facility 710.i identified by prior history 720. This protocol is defined by the facility 710.i and can be any protocol, according to FIG. 5 or 7 or according to prior art or some other protocol. If the authentication is successful, the token and the reader proceed to interact as defined by facility 710.i. (For example, the reader unlocks a building door, or provides a network access for the token, etc.) If the authentication is unsuccessful, then the token:

requests the reader to identify the facility (step 830);

engages in the authentication protocol with the reader based on the facility 710.i identified by the reader (step 840);

if authentication is successful, then the token updates the prior history 720 with the identity of the facility specified by the reader (step 850). The token and the reader proceed to interact as defined by this facility.

Many variations are possible. For example, in some embodiments, at step 830, the token does not request the reader to identify the facility but instead picks another available facility. For example, if the token has keys for only two facilities, the token will just pick the other facility than the facility selected at step 810. If the authentication with this facility fails, the token may request the reader to identify the facility (if the token has data for more than two facilities for example), or the token may pick a third facility and again attempt authentication.

Prior history 720 may contain many types of information regarding the token communications with readers, and the token may use many types of algorithms to select a facility at step 810 and/or at subsequent steps in case of authentication failure instead of requesting the reader to identify the facility.

Authentication may be replaced by, or used together with, other types of cryptographic communication, e.g. encrypted communication between a mobile device 110 and a server 144. For such cryptographic communication, one or more possible error conditions can be defined (such as authentication errors or errors unrelated to authentication) at least one of which is an indication that the token or other mobile device 110 is communicating with a wrong facility, i.e. not the facility associated with the key or protocol or other cryptographic material used by device 110. For example, in case of encrypted communication, mobile device 110 may get errors while using data received from device 144. At any rate, if no such error condition occurs, then the communication is considered a success at 820 or 840; otherwise the communication is considered a failure.

The invention is not limited to the embodiments described above. In particular, the invention is not limited to a particular type of a mobile device 110 or a device 144 (e.g. a reader or a router). For example, the device 110 may be a mobile computer having rich user interfaces usually associated with non-mobile computers. The invention is not limited to use of symmetric or asymmetric cryptography in particular operations described above. The invention includes methods described above, the apparatuses (e.g. tokens, readers, etc.) for performing such methods, and computer readable media comprising computer programs which, when executed by apparatuses having computer processors, cause the apparatuses to perform such methods.

Some embodiments provide a method for establishing a communication key (for example, a key $K_{Ui,vj}$ or its diversification) which is a shared key for communication between a first apparatus (e.g. 110) and a second apparatus (e.g. 144), the first apparatus being a mobile apparatus, wherein a shared key can be generated as being associated with any one of a set of keys available at the mobile apparatus (e.g. from any one of the current and previous keys available at the token). A key is available at the mobile apparatus if the key is stored on the mobile apparatus or if the mobile apparatus stores data from which the key can be obtained for communication with the second apparatus (e.g. if the mobile apparatus stores the key in an encrypted form which the mobile apparatus can readily decrypt). The shared key and its associated key (from which the shared key can be generated) may or may not be equal to each other. For example, the shared key associated with a key K can be K or a diversification of K. The method comprises the mobile apparatus performing operations of:

(1) receiving, from the second apparatus, key data indicating a key version of a shared key available at the second apparatus (e.g. at 518 in FIG. 5 or 7), wherein the shared key available at the second apparatus is not transmitted between the mobile apparatus and the second apparatus wherein all said keys are secret keys;

(2) examining the key version, wherein:

(2A) if the mobile apparatus determines that the key version corresponds to the current key, then the communication key used by the mobile apparatus is the shared key associated with the current key (e.g. at 522);

(2B) if the mobile apparatus determines that the key version corresponds to a previous key available at the mobile apparatus, then the mobile apparatus uses the shared key associated with the previous key to establish the communication key (e.g. at 530, 538).

Some embodiments provide a method for updating cryptographic material stored on a first apparatus and one or more second apparatuses, the first apparatus being a mobile apparatus, the cryptographic material being for use by the mobile apparatus in cryptographic communication with at least one of the one or more second apparatuses, the method comprising performing, by an updating system (e.g. a key manager), operations of:

sending a mobile-device update (e.g. a new key 138) of the cryptographic material to the mobile device; and sending a second-device update (e.g. a new key 184) of the cryptographic material to the one or more second devices;

wherein the one or more second devices are not enabled to use the second-device update until the computer system receives a confirmation that the mobile device has received the mobile-device update.

Other embodiments and variations are within the scope of the invention, as defined by the appended claims.

The invention claimed is:

1. A method comprising a first apparatus performing communication operations to communicate with a second apparatus to establish a communication key which is a shared key for communication between the first apparatus and the second apparatus, the first apparatus being a mobile apparatus, wherein a shared key can be generated as being associated with any one of a set of keys available at the mobile apparatus, (wherein the shared key and its associated key may or may not be equal to each other), the set of keys including a current key and one or more previous keys, all said keys being secret keys, said communication operations comprising:

(1) receiving, from the second apparatus, key data indicating a key version of a shared key available at the second apparatus, wherein the shared key available at the second apparatus is not transmitted between the mobile apparatus and the second apparatus, wherein all said keys are secret keys;

(2) examining the key version, wherein:

(2A) if the mobile apparatus determines that the key version corresponds to the current key, then the communication key used by the mobile apparatus is the shared key associated with the current key;

(2B) if the mobile apparatus determines that the key version corresponds to a previous key available at the mobile apparatus, then the mobile apparatus uses the shared key associated with the previous key to establish the communication key.

2. The method of claim 1 wherein, in (2B), the communication key is the shared key associated with the current key, and the mobile apparatus using the shared key associated with the previous key comprises:

the mobile apparatus using the shared key associated with the previous key to encrypt the communication key; and the mobile apparatus transmitting the encrypted communication key to the second apparatus.

3. The method of claim 1 wherein:

in (2A), the shared key associated with the current key is a diversification of the current key for the second apparatus; and in (2B), the shared key associated with a previous key is a diversification of the previous key for the second apparatus.

4. The method of claim 1 wherein, in operation (2), if the mobile apparatus determines that the key version corresponds to a previous key not available at the mobile apparatus, then:

the mobile apparatus engages in cryptographic communication using asymmetric cryptography with the second apparatus to generate an ephemeral key which is a secret key shared with the second apparatus;

the communication key used by the mobile apparatus is the shared key associated with the current key, and the mobile apparatus uses the ephemeral key to encrypt the communication key; and the mobile apparatus transmits the encrypted communication key to the second apparatus.

5. The method of claim 1 wherein:

the second apparatus is one of a plurality of second apparatuses, and each second apparatus is part of a facility which is one of a plurality of facilities, wherein each facility comprises one or more of the second apparatuses;

wherein said set of keys is one of a plurality of sets of keys which are secret keys, each set being associated with a respective one of the facilities and is for use with the associated facility, each of the sets comprising a current key for the facility and one or more previous keys for the facility, each set being available at the mobile apparatus;

wherein the method further comprises the mobile apparatus determining the facility containing the second apparatus, wherein in operation (2) the mobile apparatus uses the current and/or previous keys for the facility determined by the mobile apparatus.

6. A mobile apparatus operable to perform as a first apparatus in a method comprising:

the first apparatus performing communication operations to communicate with a second apparatus to establish a communication key which is a shared key for communication between the first apparatus and the second apparatus, the first apparatus being the mobile apparatus, the mobile apparatus comprising storage for storing a set of keys, wherein a shared key can be generated as being associated with any one of the set of keys stored at the mobile apparatus, (wherein the shared key and its associated key may or may not be equal to each other), the set of keys including a current key and one or more previous keys, all said keys being secret keys, said communication operations comprising:

(1) receiving, from the second apparatus, key data indicating a key version of a shared key available at the second apparatus, wherein the shared key available at the second apparatus is not transmitted between the mobile apparatus and the second apparatus, wherein all said keys are secret keys;

(2) examining the key version, wherein:

(2A) if the mobile apparatus determines that the key version corresponds to the current key, then the communication key used by the mobile apparatus is the shared key associated with the current key;

(2B) if the mobile apparatus determines that the key version corresponds to a previous key stored at the mobile apparatus, then the mobile apparatus uses the shared key associated with the previous key to establish the communication key.

7. The mobile apparatus of claim 6 wherein, in (2B), the communication key is the shared key associated with the current key, and the mobile apparatus using the shared key associated with the previous key comprises:

the mobile apparatus using the shared key associated with the previous key to encrypt the communication key; and the mobile apparatus transmitting the encrypted communication key to the second apparatus.

8. The mobile apparatus of claim 6 wherein:

in (2A), the shared key associated with the current key is a diversification of the current key for the second apparatus; and in (2B), the shared key associated with a previous key is a diversification of the previous key for the second apparatus.

9. The mobile apparatus of claim 6 wherein, in operation (2), if the mobile apparatus determines that the key version corresponds to a previous key not stored at the mobile apparatus, then:
  the mobile apparatus engages in cryptographic communication using asymmetric cryptography with the second apparatus to generate an ephemeral key which is a secret key shared with the second apparatus;
  the communication key used by the mobile apparatus is the shared key associated with the current key, and the mobile apparatus uses the ephemeral key to encrypt the communication key; and
  the mobile apparatus transmits the encrypted communication key to the second apparatus.

10. A method comprising a second apparatus performing operations for establishing a communication key which is a shared key for communication between a first apparatus and the second apparatus, the first apparatus being a mobile apparatus, wherein a shared key can be generated as being associated with any one of a plurality of keys available at the mobile apparatus, (wherein the shared key and its associated key may or may not be equal to each other), the plurality of keys including a current key and one or more previous keys, all said keys being secret keys, wherein the operations for establishing the communication key comprise:
  (1) sending, to the mobile apparatus, key data indicating a key version of a shared key available at the second apparatus, wherein the shared key available at the second apparatus is not transmitted between the mobile apparatus and the second apparatus, wherein all said keys are secret keys;
  (2) receiving, from the mobile apparatus, encrypted data defining the communication key;
  (3) using the shared key available at the second apparatus to decrypt the encrypted data and recover the communication key.

11. The method of claim 10 wherein:
  the second apparatus is one of a plurality of apparatuses, and each apparatus of the plurality is part of a facility which is one of a plurality of facilities, wherein each facility comprises one or more of the apparatuses of said plurality of apparatuses;
  wherein the method further comprises the second apparatus sending to the mobile apparatus an identifier of the facility containing the second apparatus.

12. A second apparatus operable to perform a method comprising:
  performing operations for establishing a communication key which is a shared key for communication between a first apparatus and the second apparatus, the first apparatus being a mobile apparatus, wherein a shared key can be generated as being associated with any one of a plurality of keys available at the mobile apparatus, (wherein the shared key and its associated key may or may not be equal to each other), the plurality of keys including a current key and one or more previous keys, all said keys being secret keys, wherein the operations for establishing the communication key comprise:
  (1) sending, to the mobile apparatus, key data indicating a key version of a shared key available at the second apparatus, wherein the shared key available at the second apparatus is not transmitted between the mobile apparatus and the second apparatus, wherein all said keys are secret keys;
  (2) receiving, from the mobile apparatus, encrypted data defining the communication key;
  (3) using the shared key available at the second apparatus to decrypt the encrypted data and recover the communication key.

13. The second apparatus of claim 12 wherein:
  the second apparatus is operable as one of a plurality of apparatuses, wherein each apparatus of the plurality is part of a facility which is one of a plurality of facilities, wherein each facility comprises one or more of the apparatuses of said plurality of apparatuses;
  wherein the operations performed by the second apparatus for establishing the communication key further comprise sending to the mobile apparatus an identifier of the facility containing the second apparatus.

14. A method comprising a second apparatus performing operations for establishing a communication key which is a shared key for communication between a first apparatus and the second apparatus, the first apparatus being a mobile apparatus, wherein a shared key can be generated as being associated with any one of a plurality of keys available at the mobile apparatus, (wherein the shared key and its associated key may or may not be equal to each other), the plurality of keys including a current key and one or more previous keys, all said keys being secret keys, wherein the operations for establishing the communication key comprise:
  (1) engaging in communication with the mobile apparatus to obtain an indication of whether or not there is a shared key available at both the mobile apparatus and the second apparatus;
  (2) if a shared secret key is not available at both the second apparatus and the mobile apparatus, then:
  (2A) the second apparatus engaging in cryptographic communication using asymmetric cryptography with the mobile apparatus to generate an ephemeral key which is a secret key shared with the mobile apparatus;
  (2B) the second apparatus receiving, from the mobile apparatus, encrypted data defining the communication key;
  (2C) the second apparatus using the ephemeral key available at the second apparatus to decrypt the encrypted data and recover the communication key.

15. A second apparatus operable to perform a method comprising:
  performing operations for establishing a communication key which is a shared key for communication between a first apparatus and the second apparatus, the first apparatus being a mobile apparatus, wherein a shared key can be generated as being associated with any one of a plurality of keys available at the mobile apparatus, (wherein the shared key and its associated key may or may not be equal to each other), the plurality of keys including a current key and one or more previous keys, all said keys being secret keys, wherein the operations for establishing the communication key comprise:
  (1) engaging in communication with the mobile apparatus to obtain an indication of whether or not there is a shared key available at both the mobile apparatus and the second apparatus;
  (2) if a shared secret key is not available at both the second apparatus and the mobile apparatus, then:
  (2A) the second apparatus engaging in cryptographic communication using asymmetric cryptography with the mobile apparatus to generate an ephemeral key which is a secret key shared with the mobile apparatus;
  (2B) the second apparatus receiving, from the mobile apparatus, encrypted data defining the communication key;
  (2C) the second apparatus using the ephemeral key available at the second apparatus to decrypt the encrypted data and recover the communication key.

16. A method comprising a first apparatus conducting communication with a second apparatus which is one of a plurality of apparatuses each of which belongs to at least one facility, the communication comprising cryptographic communication, the first apparatus being a mobile apparatus, wherein the mobile apparatus stores a plurality of sets of cryptographic data which are associated with respective facilities, each facility comprising one or more of the apparatuses of the plurality of apparatuses, different sets being associated with different facilities, each set being for use in cryptographic communication with the associated facility, wherein each set and its associated facility are associated with one or more possible error conditions at least one of which is an indication that the mobile apparatus may be communicating with a facility different from the associated facility,
wherein the mobile apparatus comprises storage for storing prior history of facility access;
wherein the communication comprises the mobile apparatus performing operations of:
(1) selecting a facility based on the prior history;
(2) using the set associated with the facility selected based on the prior history to engage in the cryptographic communication with the second apparatus;
(3) if the cryptographic communication in (2) fails due to one or more of the one or more error conditions associated with the set selected by the mobile apparatus, then:
(3A) the mobile apparatus selecting another facility for the cryptographic communication; and
(3B) the mobile apparatus using the set associated with the other facility to engage in the cryptographic communication with the second apparatus.

17. The method of claim 16 wherein in (1), the mobile apparatus selecting a facility based on the prior history comprises the mobile apparatus using the facility specified by the prior history as the most recent facility for which the cryptographic communication with the mobile apparatus did not produce any one of the associated one or more error conditions; and
in (3B) if the mobile apparatus uses the set associated with the other facility and the cryptographic communication does not produce any one of the one or more errors associated with the other facility, then the mobile apparatus updates the prior history to specify the other facility as the most recent facility for which the cryptographic communication did not produce any one of the associated one or more error conditions.

18. The method of claim 16 wherein in (3A), the mobile apparatus selecting another facility comprises the mobile apparatus receiving facility identification from the second apparatus, and in (3B) the mobile apparatus uses the facility associated with the facility identification as the other facility.

19. A mobile apparatus operable to perform as a first apparatus in a method comprising:
the first apparatus conducting communication with a second apparatus which is one of a plurality of apparatuses each of which belongs to at least one facility, the communication comprising cryptographic communication, the first apparatus being the mobile apparatus, wherein the mobile apparatus comprises storage for storing a plurality of sets of cryptographic data which are associated with respective facilities, each facility comprising one or more of the apparatuses of the plurality of apparatuses, different sets being associated with different facilities, each set being for use in cryptographic communication with the associated facility, wherein each set and its associated facility are associated with one or more possible error conditions at least one of which is an indication that the mobile apparatus may be communicating with a facility different from the associated facility,
wherein the mobile apparatus comprises storage for storing prior history of facility access;
wherein the communication comprises the mobile apparatus performing operations of:
(1) selecting a facility based on the prior history;
(2) using the set associated with the facility selected based on the prior history to engage in the cryptographic communication with the second apparatus;
(3) if the cryptographic communication in (2) fails due to one or more of the one or more error conditions associated with the set selected by the mobile apparatus, then:
(3A) the mobile apparatus selecting another facility for the cryptographic communication; and
(3B) the mobile apparatus using the set associated with the other facility to engage in the cryptographic communication with the second apparatus.

20. The mobile apparatus of claim 19 wherein in (1), the mobile apparatus selecting a facility based on the prior history comprises the mobile apparatus using the facility specified by the prior history as the most recent facility for which the cryptographic communication with the mobile apparatus did not produce any one of the associated one or more error conditions; and
in (3B) if the mobile apparatus uses the set associated with the other facility and the cryptographic communication does not produce any one of the one or more errors associated with the other facility, then the mobile apparatus updates the prior history to specify the other facility as the most recent facility for which the cryptographic communication did not produce any one of the associated one or more error conditions.

21. The mobile apparatus of claim 19 wherein in (3A), the mobile apparatus selecting another facility comprises the mobile apparatus receiving facility identification from the second apparatus, and in (3B) the mobile apparatus uses the facility associated with the facility identification as the other facility.

22. The method of claim 1 wherein the first apparatus receives a new current key once in a while, and each current key becomes a previous key when the new current key is received.

23. The mobile apparatus of claim 6 wherein the mobile apparatus is operable to receive a new current key once in a while, wherein each current key becomes a previous key when the new current key is received.

24. The method of claim 10 wherein the first apparatus receives a new current key once in a while, and each current key becomes a previous key when the new current key is received.

25. The second apparatus of claim 12 wherein the mobile apparatus is operable to receive a new current key once in a while, wherein each current key becomes a previous key when the new current key is received.

26. The method of claim 14 wherein the first apparatus receives a new current key once in a while, and each current key becomes a previous key when the new current key is received.

27. The second apparatus of claim 15 wherein the mobile apparatus is operable to receive a new current key once in a while, wherein each current key becomes a previous key when the new current key is received.

28. The method of claim 10 wherein the communication key is a shared key associated with the current key.

29. The second apparatus of claim 12 wherein the communication key is a shared key associated with the current key.

30. The method of claim 14 wherein the communication key is a shared key associated with the current key.

31. The second apparatus of claim 15 wherein the communication key is a shared key associated with the current key.

32. The method of claim 16 wherein in operation (1), the mobile apparatus selects the facility without determining from a message from the second apparatus whether the second apparatus belongs to the selected facility.

33. The mobile apparatus of claim 19 wherein in operation (1), the mobile apparatus selects the facility without determining from a message from the second apparatus whether the second apparatus belongs to the selected facility.

34. The method of claim 16 wherein for each set, each of the associated one or more error conditions is operable to occur when the mobile apparatus uses the set to communicate with an apparatus belonging to a facility not associated with the set.

35. The mobile apparatus of claim 19 wherein for each set, each of the associated one or more error conditions is operable to occur when the mobile apparatus uses the set to communicate with an apparatus belonging to a facility not associated with the set.

36. The method of claim 16 wherein for at least one set to which the second apparatus does not belong, each of the associated one or more error conditions is operable to occur when the mobile apparatus uses the set to communicate with the second apparatus.

37. The mobile apparatus of claim 19 wherein for at least one set to which the second apparatus does not belong, each of the associated one or more error conditions is operable to occur when the mobile apparatus uses the set to communicate with the second apparatus.

* * * * *